Patented June 24, 1930

1,765,367

UNITED STATES PATENT OFFICE

PAUL DIETERLE, OF BUFFALO, NEW YORK, ASSIGNOR TO NATIONAL ANILINE & CHEMICAL COMPANY, INC., OF NEW YORK, N. Y., A CORPORATION OF NEW YORK

REDUCTION OF AROMATIC NITRO COMPOUNDS

No Drawing.    Application filed October 3, 1927. Serial No. 223,834.

This invention relates to the manufacture of amino compounds by the reduction of aromatic nitro compounds which contain no hydroxyl group as a substituent attached directly to the aromatic nucleus.

It is well known that aromatic nitro compounds can be reduced to amino compounds by the action of sodium- or ammonium-sulfide under suitable conditions.

The present invention contemplates the production, and subsequent isolation thereof, of amino compounds by the reduction of aromatic nitro compounds which are free from nuclear bound hydroxyl groups to amino compounds by the action of hydrated lime and sulfur in the presence of an iron salt, particularly a ferrous salt, and in the presence or absence of an organic solvent miscible or immiscible with water, more especially an organic solvent in which the nitro body is soluble, such as benzene, solvent naphtha, ethyl alcohol, etc. The invention is applicable to the reduction of nitro derivatives of aromatic hydrocarbons and their hydroxyl-free substitution products, particularly those of the benzene and naphthalene series.

In carrying out the process, the nitro compound, which contains no nuclear bound hydroxyl group, is dissolved or suspended in any suitable neutral or alkaline liquid medium, e. g., an acid-free solvent, and subjected to the action of a mixture of calcium hydrate and sulfur in the presence of an iron salt. Temperatures of 80°–100° C. or higher are suitable, and diminished, normal, or superatmospheric pressures may be used. In place of a mixture of calcium hydrate and sulfur, calcium sulfide or calcium polysulfide, or the composite product resulting from the interaction of calcium hydrate and sulfur, may be used.

Without limiting the invention to any particular theory, the following equation is given as representing what may be regarded as taking place in the reduction of a nitro compound to an amino derivative by the action of a mixture of calcium hydrate and sulfur according to the present process:

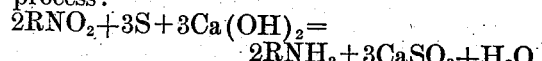

in which R represents an aromatic hydrocarbon residue which contains no nuclear bound hydroxyl group but may contain other substituent groups.

One of the advantages of the present process lies in the use of relatively cheap and stable raw materials in place of the relatively expensive and readily deteriorating materials heretofore used. Other advantages will be apparent from the further description.

The following specific examples will further illustrate the invention, but it is understood that the invention is not limited thereto. The parts are by weight.

*Example 1.*—A mixture comprising 1000 parts of water, 150 parts of hydrated lime, 60 parts of ground sulfur, 10 parts of ferrous sulfate and 123 parts of nitrobenzene is boiled under a reflux condenser for about 24 hours with good agitation. The mixture is then steam distilled and the aniline collected in any suitable manner.

*Example 2.*—A mixture comprising 1000 parts of water, 420 parts of hydrated lime, 165 parts of ground sulfur, 6 parts of ferrous sulfate, 519 parts of alpha-nitronaphthalene, and 430 parts of solvent naphtha is heated under pressure to a temperture of about 125° C. in a steel autoclave for about 9 hours with good agitation. The mixture is then cooled and filtered. The residue on the filter is washed with solvent naphtha and the washings added to the solvent naphtha which has been separated from the filtrate in any suitable way, such as by decantation. Upon distilling off the solvent naphtha and subjecting the residue to vacuum distillation, a very good yield of alpha-naphthylamine of excellent purity is obtained.

It is obvious that in the above examples calcium oxide can be used instead of calcium hydroxide, that other forms of sulfur such as flowers of sulfur can be used in place of ground sulfur, and that other ferrous compounds of iron such as the chloride or hydroxide can be used in place of ferrous sulfate.

It will thus be seen that the present invention affords an economical and convenient means for the manufacture of amino compounds from aromatic nitro compounds free from nuclear bound hydroxyl groups. Superior yields are obtained in carrying out the process of the present invention in the presence of iron salts, particularly ferrous salts, over the yields obtained in carrying out a similar process in the absence of said iron salts. The iron salt appears to act as a catalyst.

I claim:

1. In the manufacture of an amino compound, a method which comprises subjecting an aromatic nitro compound which is free from a nuclear-bound hydroxyl group to the action of hydrated lime and sulfur in the presence of a ferrous compound.

2. In the manufacture of an amino compound, a method which comprises subjecting an aromatic nitro compound which is free from a nuclear-bound hydroxyl group to the action of hydrated lime and sulfur in the presence of a ferrous salt.

3. In the manufacture of an amino compound, a method which comprises subjecting an aromatic nitro compound which is free from a nuclear bound hydroxyl group to the action of hydrated lime and sulfur in the presence of an organic solvent and of an iron salt.

4. In the manufacture of an amino compound, a method which comprises inducing a reaction between an aromatic nitro compound which is free from a nuclear bound hydroxyl group, hydrated lime, and sulfur, in the presence of water and of an iron salt.

5. In the manufacture of an amino compound, a method which comprises inducing a reaction between an aromatic nitro compound which is free from a nuclear bound hydroxyl group, hydrated lime, and sulfur, in the presence of water, an iron salt, and an organic solvent.

6. In the manufacture of an amino compound, a method which comprises heating and agitating an aromatic nitro compound which is free from a nuclear bound hydroxyl group with hydrated lime, sulfur, and ferrous sulfate in the presence of water.

7. In the manufacture of an amino compound, a method which comprises subjecting a nitro compound of the benzene series which is free from a nuclear bound hydroxyl group, to the action of hydrated lime and sulfur in the presence of an iron salt.

8. In the manufacture of an amino compound, a method which comprises subjecting a nitro compound of the benzene series which is free from a nuclear bound hydroxyl group, to the action of hydrated lime and sulfur in the presence of an organic solvent and of a ferrous compound.

9. In the manufacture of aniline, a method which comprises subjecting nitrobenzene to the action of hydrated lime and sulfur in the presence of a ferrous compound.

10. In the manufacture of aniline, a method which comprises heating and agitating nitrobenzene with hydrated lime, sulfur, and ferrous sulfate in the presence of water.

11. In the production of aniline, a method which comprises subjecting nitrobenzene to the action of hydrated lime and sulfur in the presence of a ferrous salt.

12. In the production of aniline, the method which comprises heating an agitating nitro benzene, hydrated lime and sulfur in the presence of water, and of a ferrous compound.

13. In the production of aniline, the method which comprises boiling a mixture of nitrobenzene, hydrated lime, sulfur, a ferrous salt, and an organic solvent.

14. In the manufacture of an amino compound, a process which comprises heating an organic nitro compound which is free from a nuclear bound hydroxyl group with a sulfide of calcium in the presence of an immiscible organic solvent and of an iron salt.

15. In the manufacture of an amino compound, a method which comprises subjecting an aromatic nitro compound which is free from a nuclear-bound hydroxyl to the action of a sulfide of calcium and water in the presence of an iron salt.

16. In the manufacture of an amino compound, a method which comprises subjecting an aromatic nitrocompound of the benzene series which is free from a nuclear bound hydroxyl group to the action of a sulfide of calcium and water in the presence of a ferrous compound and an organic solvent.

17. In the manufacture of aniline, a method which comprises subjecting nitrobenzene to the action of a sulfide of calcium and water in the presence of ferrous sulfate and an immiscible organic solvent.

18. In the manufacture of an amino compound, a method which comprises subjecting an aromatic nitro compound which is free from a nuclear-bound hydroxyl group to the action of hydrated lime and sulfur in the presence of ferrous sulfate.

19. In the manufacture of an amino compound, a method which comprises subjecting an aromatic nitro compound which is free from a nuclear-bound hydroxyl group to the action of hydrated lime, water, sulfur, and ferrous salt in the presence of an organic solvent.

20. In the manufacture of an amino compound, a method which comprises subjecting an aromatic nitro compound which is free from a nuclear-bound hydroxyl group to the action of calcium sulfide, water and ferrous sulfate in the presence of an immiscible organic solvent.

21. In the manufacture of aniline, a method which comprises subjecting nitrobenzene to the action of hydrated lime, sulfur, water and ferrous sulfate in the presence of an organic solvent.

In testimony whereof I affix my signature.

PAUL DIETERLE.